United States Patent [19]

Brewer et al.

[11] Patent Number: 4,594,672
[45] Date of Patent: Jun. 10, 1986

[54] MULTI-COLUMN PLOTTER

[75] Inventors: Howard E. Brewer, Santa Ana; A. William Lyons, II, Seal Beach, both of Calif.

[73] Assignee: Sanders Associates, Inc., Nashua, N.H.

[21] Appl. No.: 538,876

[22] Filed: Oct. 4, 1983

[51] Int. Cl.⁴ .................................... G06F 15/50
[52] U.S. Cl. ...................... 364/520; 270/21.1; 340/731
[58] Field of Search .................. 364/518–520, 364/475; 340/713, 718, 723, 724, 730, 731; 270/21.1

[56] References Cited

U.S. PATENT DOCUMENTS

| | | | |
|---|---|---|---|
| 3,636,328 | 1/1972 | Korelitz et al. | 364/520 X |
| 4,192,002 | 3/1980 | Draper | 364/520 X |
| 4,381,107 | 4/1983 | Armiger | 270/21.1 X |
| 4,466,603 | 8/1984 | Schnell | 270/21.1 X |
| 4,477,802 | 10/1984 | Walter et al. | 340/731 X |

Primary Examiner—Errol A. Krass
Assistant Examiner—H. R. Herndon
Attorney, Agent, or Firm—Louis Etlinger; Wm. F. Porter, Jr.

[57] ABSTRACT

A graphics drum plotter in which wide strip paper is divided into virtual columns. An operator interface is provided whereby an operator can define the size and number of columns across the strip paper. Instead of producing a series of small plots along one edge of the wide strip, the system includes logic to place the series of plots sequentially across the columns of the strip paper before advancing the strip paper to a next writing area. A paper slitter is also provided to slit the paper on the column lines after the printing thereon.

6 Claims, 5 Drawing Figures

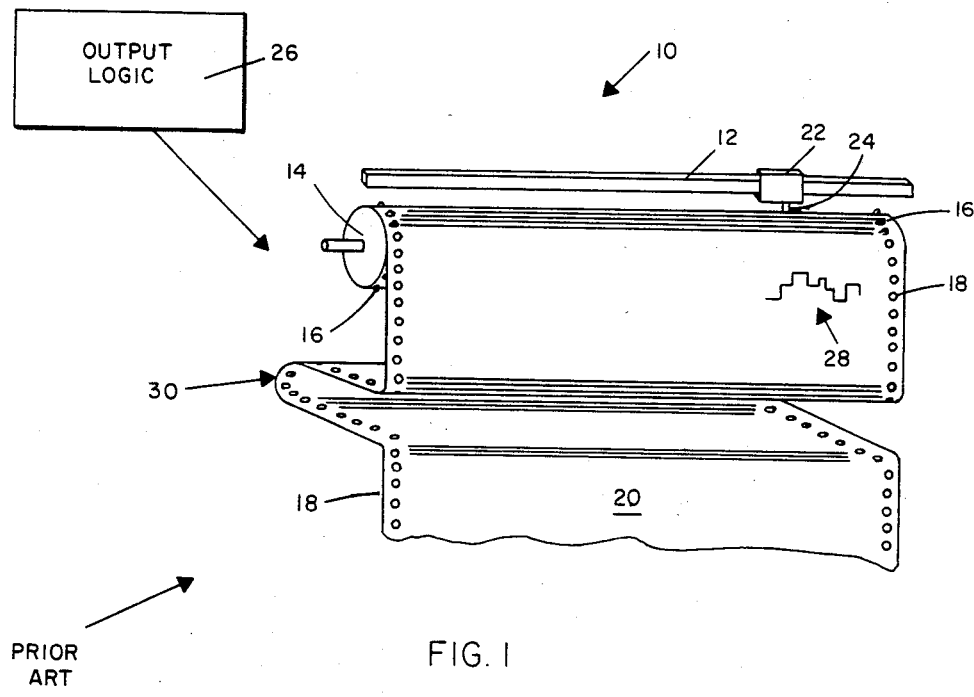
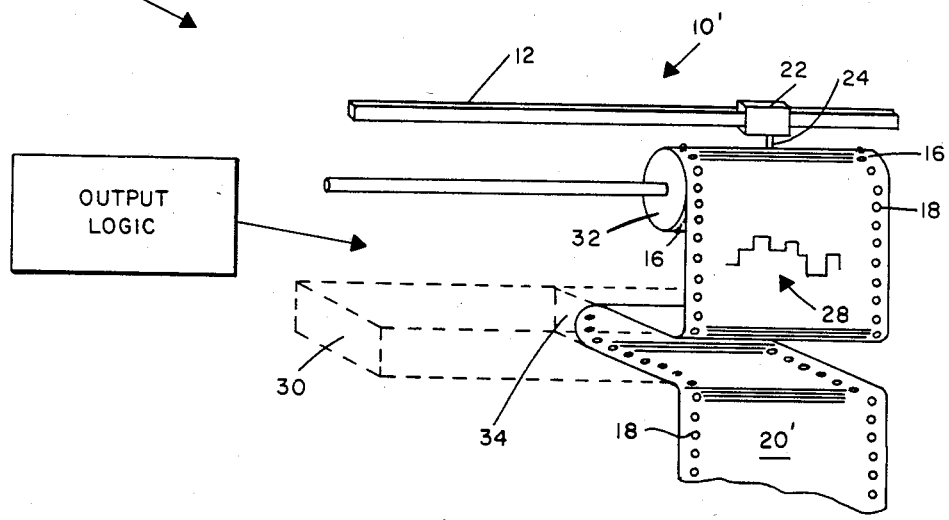
PRIOR ART
FIG. 1
FIG. 2

MULTI-COLUMN PLOTTER

BACKGROUND OF THE INVENTION

The present invention relates to graphics drum plotters and, more particularly, to a graphics drum plotter creating virtual columns on the strip paper and placing the plots across the strip in the columns before advancing the strip so as to employ the entire paper width.

A typical prior art drum plotter is shown in simplified form and generally indicated as 10 in FIG. 1. The plotter 10 has a beam 12 disposed parallel to and spaced from a drum 14. The drum 14 has sprockets 16 along both edges adapted to mate with holes 18 in strip paper 20. A writing head 22 carrying a pen 24 is mounted on the beam 12. Under the control of output logic 26 connected thereto the drum 14 is rotated to move the paper 20 under the writing head 22 and pen 24 and the writing head 22 is moved back and forth on the beam 12 so as to create a series of plots 28 on the strip paper 20 reflecting X and Y coordinate contained in the output signals from the output logic 26. Typically, the strip paper 20 passes into a pair of vacuum columns, such as that generally indicated by the area 30, adjacent the drum 14 so as to prevent undue stresses on the strip paper 20 as the drum 14 is rotated and quickly reversed in direction during the plotting process.

As can be seen in the example of FIG. 1, if the series of plots 28 are small in size, a sequence of plots 28 will be created along one edge of the strip paper 20 with the balance of the strip paper 20 being wasted. As shown in FIG. 2, the alternative has been to replace the drum 14 with a shortened drum 32 which also requires the placing of a baffle as at position 34 within the vacuum columns 30 so as to properly draw the narrower strip paper 20 then employed therein. Obviously, such a changeover procedure between narrow plots and wide plots is both time consuming and bothersome. Wherefore, it is the object of the present invention to provide a system for efficiently using wide paper and its associated drum in producing small plots.

SUMMARY

The foregoing objective has been met in a graphics drum plotter system which has a writing head driven traversely across a driven drum rotating to move strip paper therebeneath in response to X,Y coordinate defining output signals from a source to the writing head and the drum to create a series of plots by the improvement of the present invention comprising means for defining margin numbers and locations for longitudinally dividing the strip paper into columns; and, means disposed between the source, the writing head and the drum for sequencing the plots across the columns before advancing the strip paper.

In the preferred embodiment, the invention also includes means for slitting the paper into the columns disposed after the writing head.

DESCRIPTION OF THE DRAWINGS

FIG. 1 is a simplified drawing of a graphics drum plotter according to the prior art producing narrow plots along one edge of wide strip paper.

FIG. 2 is a simplified drawing of a prior art approach to creating a series of narrow plots on the equipment of FIG. 1.

DESCRIPTION OF THE PREFERRED EMBODIMENT

Figure 3:
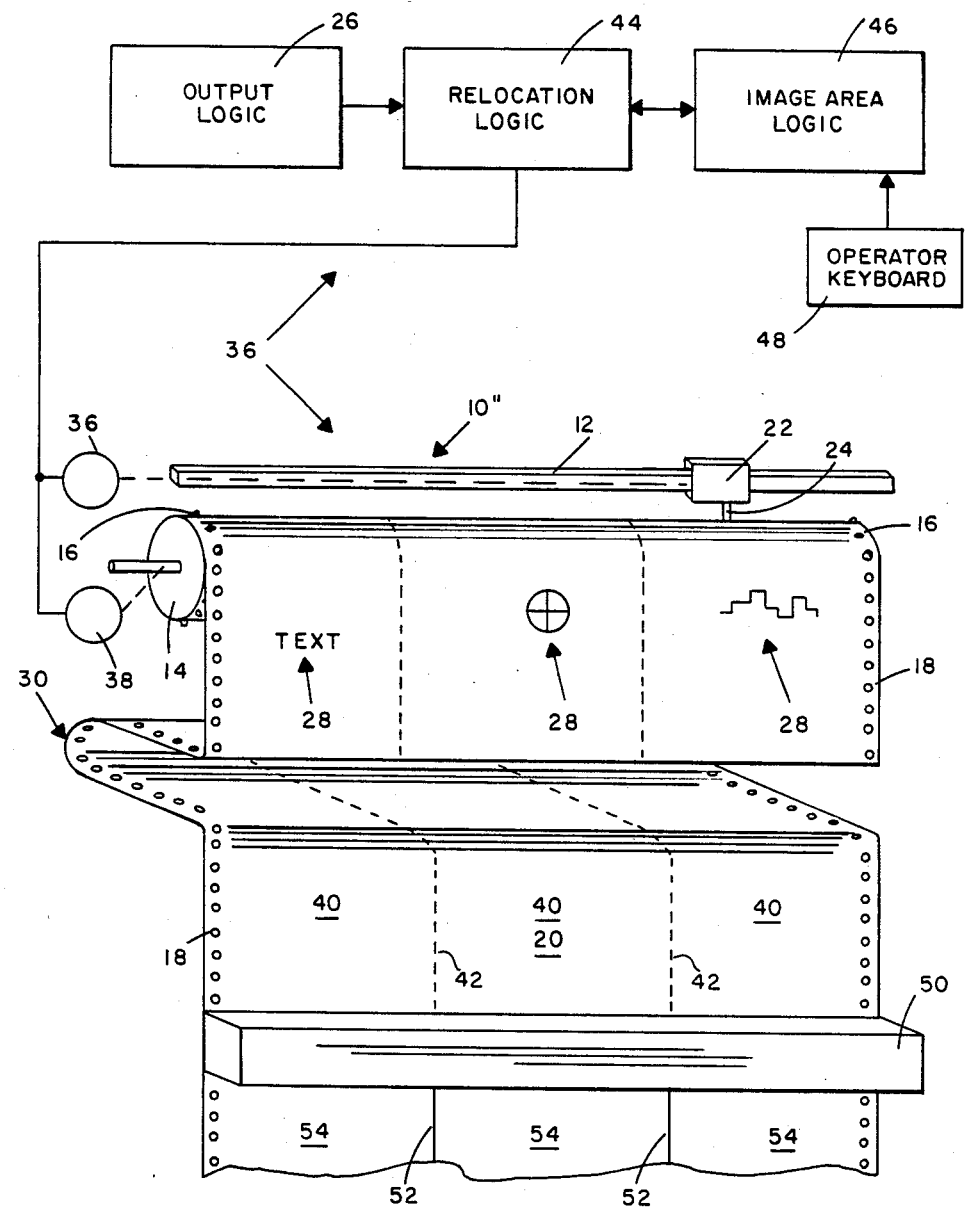
FIG. 3 is a simplified drawing of a graphics drum plotter system according to the present invention.

Turning first to FIG. 3, a graphics drum plotter system according to the present invention is generally indicated as 36. The plotter portion 10" is generally identical to that indicated in FIG. 1, having a drum 14 and a beam 12 with a writing head 22 carrying a pen 24 thereon whereby strip paper 20 is moved beneath the moving writing head 22 to create the plots 28. Motor 36 is connected to drive the writing head 22 traversely across the surface of the strip paper 20 while motor 38 is connected to rotate the drum 14 to effect the movement of the paper 20 beneath the writing head 22 as well as to advance the paper 20 to a new writing position longitudinally thereon. In the particular example as shown, the paper 20 is divided into three virtual columns 40 as indicated by the dotted lines 42. For purposes of example only, three columns 40 are employed in the description herein. Those skilled in the art will understand that more or less columns could be employed, as desired.

Whereas the output logic 26 was connected directly to drive the drum 14 and writing head 22 in the prior art apparatus of FIG. 1, according to the system 36 of the present invention, output logic 26 is connected to relocation logic 44 which, in turn, is connected to the motors 36, 38 to effect the desired motion in a modified manner. Additionally, image area defining logic 46 is connected to interface with the relocation logic 44 and an operator keyboard 48 is connected to the image area defining logic 46. These will be discussed in greater detail shortly.

As shown in FIG. 3, instead of creating a series of plots 28 down one side of the wide strip paper 20 as in the case of the prior art system of FIG. 1, the system 36 of the present invention places one plot 28 in each virtual column 40 across the strip paper 20 before advancing the paper 20 to a new writing area. This is shown graphically in FIG. 4. Normally, a point in a first plot 28 such as that labelled "$X_1,Y_1$" would be followed in a single column by another plot 28 having, for example, point "$X_2,Y_2$" and thereafter by another plot 28 containing a point "$X_3,Y_3$" as shown across the top of the paper 20 in FIG. 4. According to the present system, however, the point $X_2,Y_2$ from the second plot of the series would occur in the second column from the top, being offset by the distance of margin 1, such that the point would occur at a point $X_2$ (without a paper advance), $Y_2$-margin 1. In similar fashion, the third plot would be in the third column with the point $X_3,Y_3$ having the coordinates $X_3$ (without two paper advances), $Y_3$-margin 2. The paper 20 would then be advanced and the next series of three plots would be plotted across the three columns 40.

Figure 4:
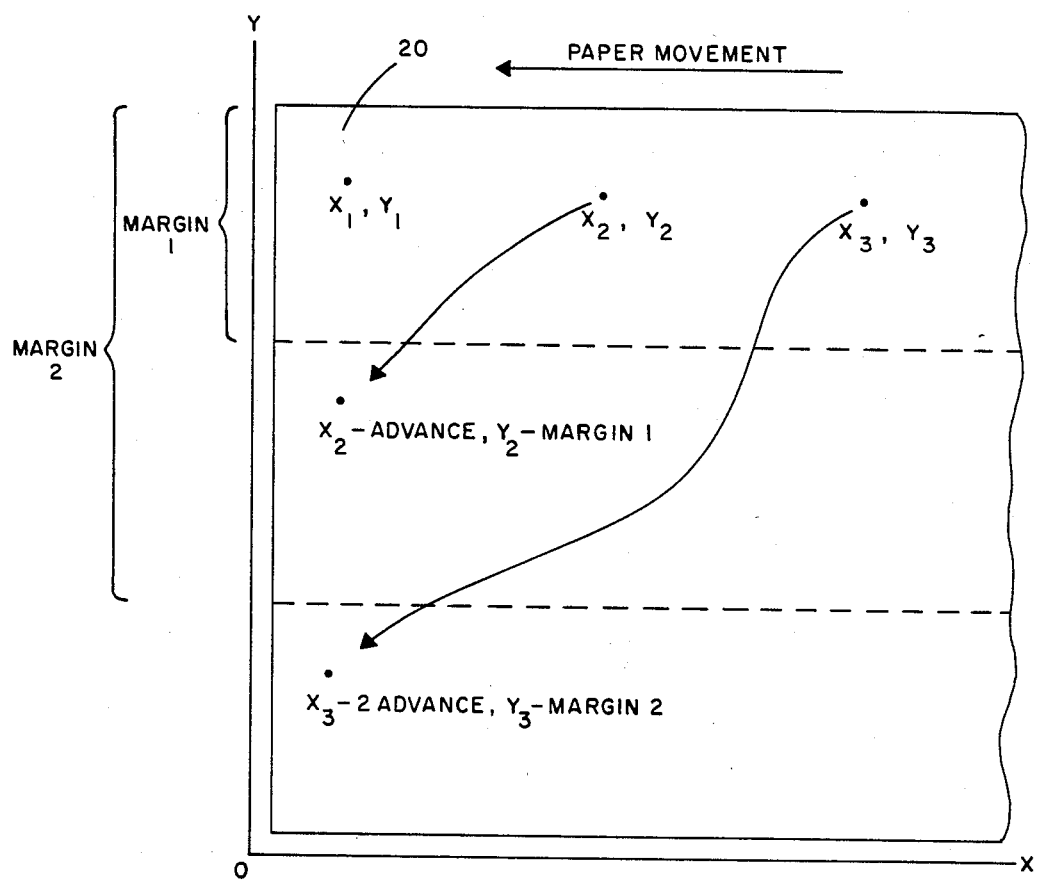
FIG. 4 is a drawing of the manner in which plot data is relocated according to the method of the present invention.
Figure 5:
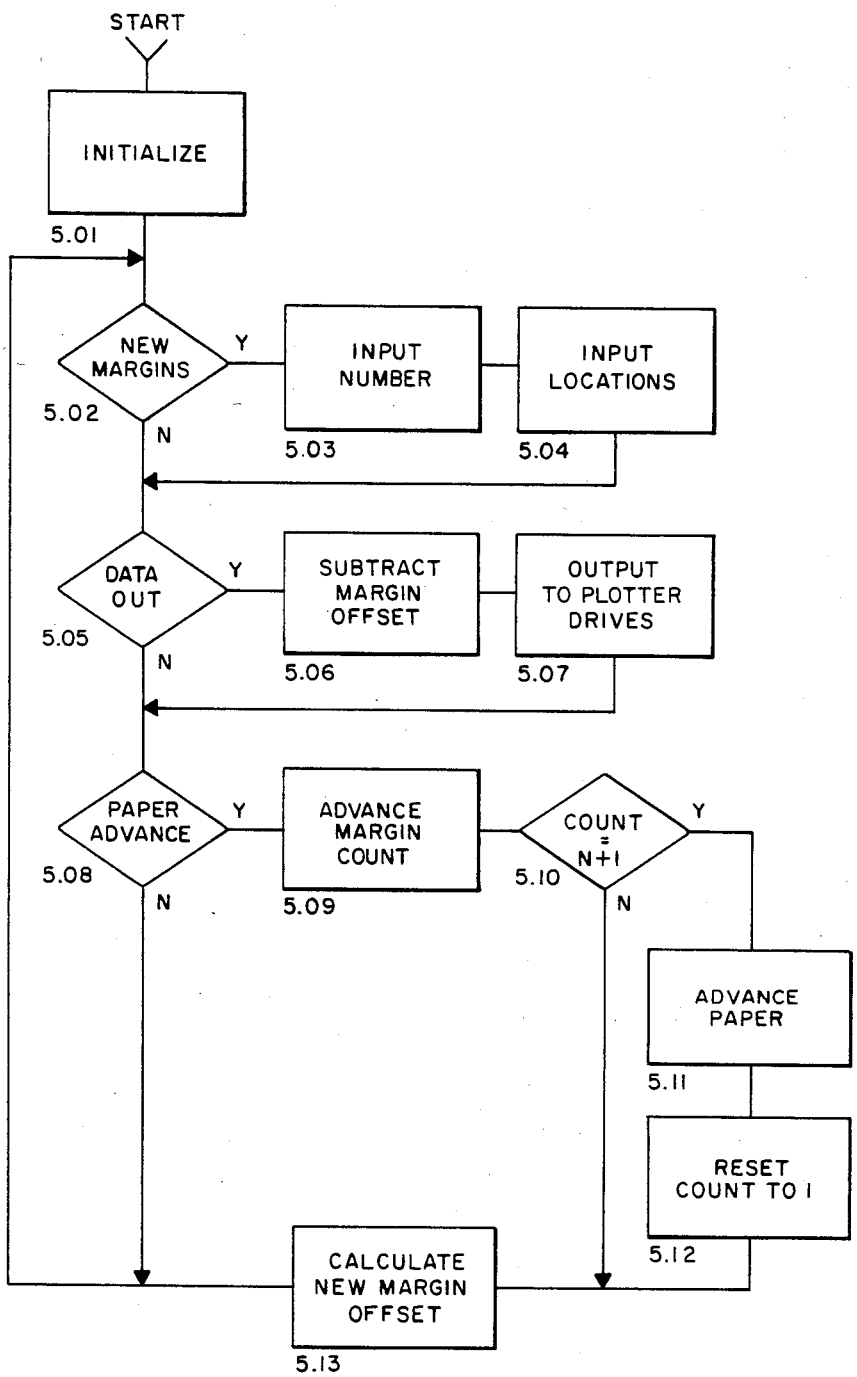
FIG. 5 is a logic flow chart of the logic generally accomplished in the system of the present invention of FIG. 3.

Turning now to FIG. 5, the logic accomplished within relocation logic 44 is shown. Initially, at action block 5.01, the parameters would be initialized such as, for example, setting the margins to one margin at the normal location for full width plotting. At question block 5.02, the logic then checks to see if new margins are to be input through the operator keyboard 48. This can be easily accomplished by polling an operator request waiting key on the keyboard 48. If the operator wishes to set new margins, the number of margins is input at action block 5.03 and the locations of the margins is input at action block 5.04. This is actually accomplished by the image area defining logic 46 interfacing with the operator keyboard 48 in a manner readily apparent to those skilled in the art. The defining parameters as input by the image area defining logic 46, are merely stored for use by the logic of FIG. 5. The logic next proceeds at question block 5.05 to see if data is to be output, that is, if output logic 26 has a plot creating movement command to be sent to the motors 36, 38. If it has, the margin offset as discussed with reference to FIG. 4 is subtracted at action block 5.06 and at action block 5.07, the output, as adjusted for relocating the plot, is output to the motors 36, 38. At question block 5.08, the logic next checks to see if a paper advance signal is being output by the output logic 26. If it is, this indicates that the plot 28 being plotted has been completed and that the output logic is attempting to advance the paper 20 to a next plot location. If that is the case, at action block 5.09, the logic advances the margin count by one, and at question block 5.10 it checks to see if the count is now equal to N+1; that is, one greater than the number input at action block 5.03. If the count is now equal to N+1, all the columns 40 across the paper strip have been filled with plots and it is time to advance the paper, which is accomplished at action block 5.11, after which the margin count is reset to margin #1 at action block 5.12. At action block 5.13 the new margin offset as employed in the description of FIG. 4 is calculated and stored, based on the location of the margin dividing lines 42. The logic then returns to question block 5.02 to complete the plotting.

Those skilled in the art will recognize that the foregoing logic is directed to the basic steps unique to the present invention and that additional, more generalized steps will need to be inserted as well for completeness.

In the system 36 according to the present invention, it is preferred that a slitter 50 be disposed traverse of the paper 20 so as to physically slit the paper 20 at lines 52 and thus slit the columns 40 into physical strips of paper 54. If desired, perforated strip paper could also be employed.

Thus, it can be seen that the present invention has met its stated objectives by providing a graphics drum plotter system which utilizes the full width of wide paper when producing small plots.

Wherefore, having thus described our invention, we claim:

1. In a graphics drum plotter system which has a writing head driven traversely across a driven drum rotating to move strip paper therebeneath in response to X,Y coordinate defining output signals from a source to the writing head and the drum to create a series of unit plots across the paper, the improvement comprising:
   (a) means for defining margin numbers and locations for longitudinally dividing the strip paper into columns; and,
   (b) means disposed between the source, the writing head and the drum for sequencing complete individual portions of plots across said columns before advancing the strip paper.

2. The improvement of claim 1 and additionally comprising:
   means for slitting the paper into said columns disposed after the writing head.

3. The improvement of claim 2 further comprising:
   means separate from the margin number and location defining means and the sequencing means for separately controlling the defining and sequencing means.

4. The improvement of claim 3 wherein the means for separtely controlling comprises a manually operable operator keyboard.

5. In a graphics drum plotter system wherein output logic is connected to drive a writing head traversely across a drum and to rotate the drum to move strip paper beneath the writing head to create a series of unit plots on the paper and to rotate the drum to a new plot position, the improvement comprising:
   (a) interface means for an operator to define margin numbers and locations dividing the strip paper into virtual columns;
   (b) image area defining logic means connected to said interface means for reading the operator inputs thereto and for creating data parameters reflecting those inputs; and,
   (c) relocation logic means connected to said image area defining means and between said output logic and the writing head and the drum for reading the data parameters and for accomplishing the steps of:
   (c1) initializing data parameters;
   (c2) checking to see if the operator is requesting the input of new margin numbers and if he is not, proceeding to step (c5);
   (c3) inputting the number of columns desired by way of said image area defining logic means;
   (c4) inputting the locations of the margin numbers desired by means of said image area defining logic means;
   (c5) checking to see if there is data to be output and if not, proceeding to step (c8);
   (c6) subtracting the desired margin location number from the data to be output;
   (c7) outputting the modified data parameters to the head and drum drives;
   (c8) checking to see if the paper is to be advanced to a new plot location and if not, proceeding back to step (c2);
   (c9) advancing the margin number;
   (c10) checking to see if the margin number is equal to one greater than the number of columns input at step (c3) and if not, proceeding to step (c13);
   (c11) advancing the paper to a next plot location;
   (c12) resetting the margin number to margin number 1;
   (c13) calculating a new desired margin location number offset use in step (c6) as a function of the next margin location as input by step (c4); and,
   (c14) proceeding back to step (c2).

6. The improvement of claim 5 and additionally comprising:
   means disposed after said writing head for slitting the paper into physical columns along the lines dividing said virtual columns.

* * * * *